(12) United States Patent
Gulati et al.

(10) Patent No.: US 8,856,784 B2
(45) Date of Patent: Oct. 7, 2014

(54) DECENTRALIZED MANAGEMENT OF VIRTUALIZED HOSTS

(75) Inventors: Ajay Gulati, Palo Alto, CA (US); Irfan Ahmad, Mountain View, CA (US); Ganesha Shanmuganathan, Mountain View, CA (US); Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 153 days.

(21) Appl. No.: 13/159,935

(22) Filed: Jun. 14, 2011

(65) Prior Publication Data
US 2012/0324441 A1 Dec. 20, 2012

(51) Int. Cl.
*G06F 9/455* (2006.01)
*G06F 9/50* (2006.01)
*H04L 29/08* (2006.01)
*G06F 11/34* (2006.01)

(52) U.S. Cl.
CPC ........... *G06F 9/5088* (2013.01); *H04L 67/1008* (2013.01); *G06F 11/3433* (2013.01); *G06F 2201/815* (2013.01)
USPC .......................................................... 718/1

(58) Field of Classification Search
USPC .......................................................... 718/1
See application file for complete search history.

(56) References Cited

U.S. PATENT DOCUMENTS

| | | | |
|---|---|---|---|
| 7,539,782 B2 | 5/2009 | Davis et al. | |
| 7,693,991 B2 | 4/2010 | Greenlee et al. | |
| 7,694,304 B2 | 4/2010 | Kissell | |
| 7,725,559 B2 | 5/2010 | Landis et al. | |
| 7,870,301 B2 | 1/2011 | Arndt et al. | |
| 7,941,804 B1 | 5/2011 | Herington et al. | |
| 7,945,652 B2 | 5/2011 | Tsao et al. | |
| 7,996,510 B2 | 8/2011 | Vicente | |
| 8,095,928 B2 | 1/2012 | Kallahalla et al. | |
| 8,112,593 B2 | 2/2012 | Pandey | |
| 8,166,473 B2 | 4/2012 | Kinsey et al. | |
| 8,180,604 B2 | 5/2012 | Wood et al. | |
| 8,200,738 B2 | 6/2012 | Roush et al. | |
| 8,230,434 B2 * | 7/2012 | Armstrong et al. | ........... 718/104 |

(Continued)

FOREIGN PATENT DOCUMENTS

| | | |
|---|---|---|
| CN | 101765225 A | 6/2010 |
| CN | 102075434 A | 5/2011 |

(Continued)

OTHER PUBLICATIONS

Ajay Gulati et al., "Managing Resources in a Distributed System Using Dymanic Clusters", U.S. Appl. No. 13/160,215, filed Jun. 14, 2011.

(Continued)

*Primary Examiner* — Emerson Puente
*Assistant Examiner* — Charlie Sun

(57) ABSTRACT

One or more embodiments of the present invention provide a technique for effectively managing virtualized computing systems with an unlimited number of hardware resources. Host systems included in a virtualized computer system are organized into a scalable, peer-to-peer (P2P) network in which host systems arrange themselves into a network overlay to communicate with one another. The network overlay enables the host systems to perform a variety of operations, which include dividing computing resources of the host systems among a plurality of virtual machines (VMs), load balancing VMs across the host systems, and performing an initial placement of a VM in one of the host systems.

18 Claims, 14 Drawing Sheets

(56) References Cited

U.S. PATENT DOCUMENTS

| | | | |
|---|---|---|---|
| 8,244,882 | B2 | 8/2012 | Davidson |
| 8,250,572 | B2 | 8/2012 | Dahlstedt |
| 8,271,976 | B2 | 9/2012 | Vega et al. |
| 8,296,419 | B1 | 10/2012 | Khanna et al. |
| 8,296,434 | B1 | 10/2012 | Miller et al. |
| 8,316,110 | B1 | 11/2012 | Deshmukh et al. |
| 8,341,623 | B2 | 12/2012 | Korupolu et al. |
| 8,346,935 | B2 | 1/2013 | Mayo et al. |
| 8,352,940 | B2 | 1/2013 | Pafumi et al. |
| 8,356,306 | B2 | 1/2013 | Herington |
| 8,386,610 | B2 | 2/2013 | Yahalom et al. |
| 8,516,489 | B2 | 8/2013 | Laverone et al. |
| 2008/0295096 | A1* | 11/2008 | Beaty et al. ............ 718/1 |
| 2009/0070771 | A1 | 3/2009 | Yuyitung et al. |
| 2009/0119664 | A1 | 5/2009 | Pike et al. |
| 2009/0222583 | A1 | 9/2009 | Josefsberg et al. |
| 2010/0100877 | A1* | 4/2010 | Greene et al. ............ 718/1 |
| 2010/0115509 | A1 | 5/2010 | Kern et al. |
| 2010/0211958 | A1 | 8/2010 | Madison, Jr. et al. |
| 2010/0223618 | A1 | 9/2010 | Fu et al. |
| 2010/0293544 | A1 | 11/2010 | Wilson et al. |
| 2010/0306382 | A1* | 12/2010 | Cardosa et al. ........ 709/226 |
| 2011/0078467 | A1* | 3/2011 | Hildebrand ............ 713/310 |
| 2011/0185064 | A1* | 7/2011 | Head et al. ............ 709/226 |
| 2011/0209146 | A1 | 8/2011 | Box et al. |
| 2011/0258320 | A1 | 10/2011 | Jackson |
| 2012/0005346 | A1 | 1/2012 | Burckart et al. |
| 2012/0096293 | A1* | 4/2012 | Floyd et al. ............ 713/323 |
| 2012/0096461 | A1 | 4/2012 | Goswami et al. |
| 2012/0166323 | A1 | 6/2012 | Guo |
| 2012/0246317 | A1 | 9/2012 | Eriksson et al. |
| 2012/0304175 | A1 | 11/2012 | Damola et al. |
| 2013/0013766 | A1 | 1/2013 | Britsch et al. |

FOREIGN PATENT DOCUMENTS

| | | |
|---|---|---|
| EP | 2071779 A1 | 6/2009 |
| IN | 201003027 I4 | 2/2013 |
| JP | 05020104 A | 1/1993 |
| JP | 2009163710 A | 7/2009 |

OTHER PUBLICATIONS

Ajay Gulati et al., "Decentralized Management of Virtualized Hosts", U.S. Appl. No. 13/160,358, filed Jun. 14, 2011.

Notification of Transmittal of the International Search Report and the Written Opinion of the International Searching Authority, or the Declaration; International Search Report and Written Opinion of the International Searching Authority, International Patent Application No. PCT/US2011/053741 filed Sep. 28, 2011.

Notification of Transmittal of the International Search Report and the Written Opinion of the International Searching Authority, or the Declaration; International Search Report and Written Opinion of the International Searching Authority, International Patent Application No. PCT/US2011/053745 filed Sep. 28, 2011.

Anonymous: "DRS Performance and Best Practices", Internet Article, 2008, XP002668551, Retrieved from the Internet: URL:http://www.vmware.com/files/pdf/drs_performance_best_practices_wp.pdf [retrieved on Feb. 1, 2012] pp. 1-20.

Anonymous: "VMware Distributed Resource Scheduler (DRS): Dynamic Load Balancing and Resource Allocation For Virtual Machines", Internet Article, 2009, XP002668552, Retrieved from the Internet: URL:http://www.vmware.com/files/pdf/VMware-Distributed-Resource-Scheduler-DRS-DS-EN.pdf [retrieved on Feb. 1, 2012] pp. 1-3.

Govil, Kinshuk et al. "Cellular Disco: Resource Management Using Virtual Clusters on Shared Memory Multiprocessors," ACM Proceedings of the Seventh ACM Symposium on Operating Systems Principles (SOSP), ACM SIGOPS Operating Systems Review, vol. 33, Issue 5, Dec. 1999, pp. 154-169.

Waldspurger, Carl. "Memory Resource Management in VMware ESX Server," ACM Proceedings of the 5th Symposium on Operating Systems (SIGOPS) Design and Implementation, vol. 36, Issue SI, Winter 2002, pp. 181-194.

Foster, I. et al. "Virtual Clusters for Grid Communities," Sixth IEEE International Symposium on Cluster Computing and the Grid (CCGRID), vol. 1, May 16-19, 2006, pp. 513-520.

Sotomayor, B. et al. "Virtual Infrastructure Management in Private and Hybrid Clouds," IEEE Internet Computing, vol. 13, Issue 5, Sep.-Oct. 2009, pp. 14-22.

\* cited by examiner

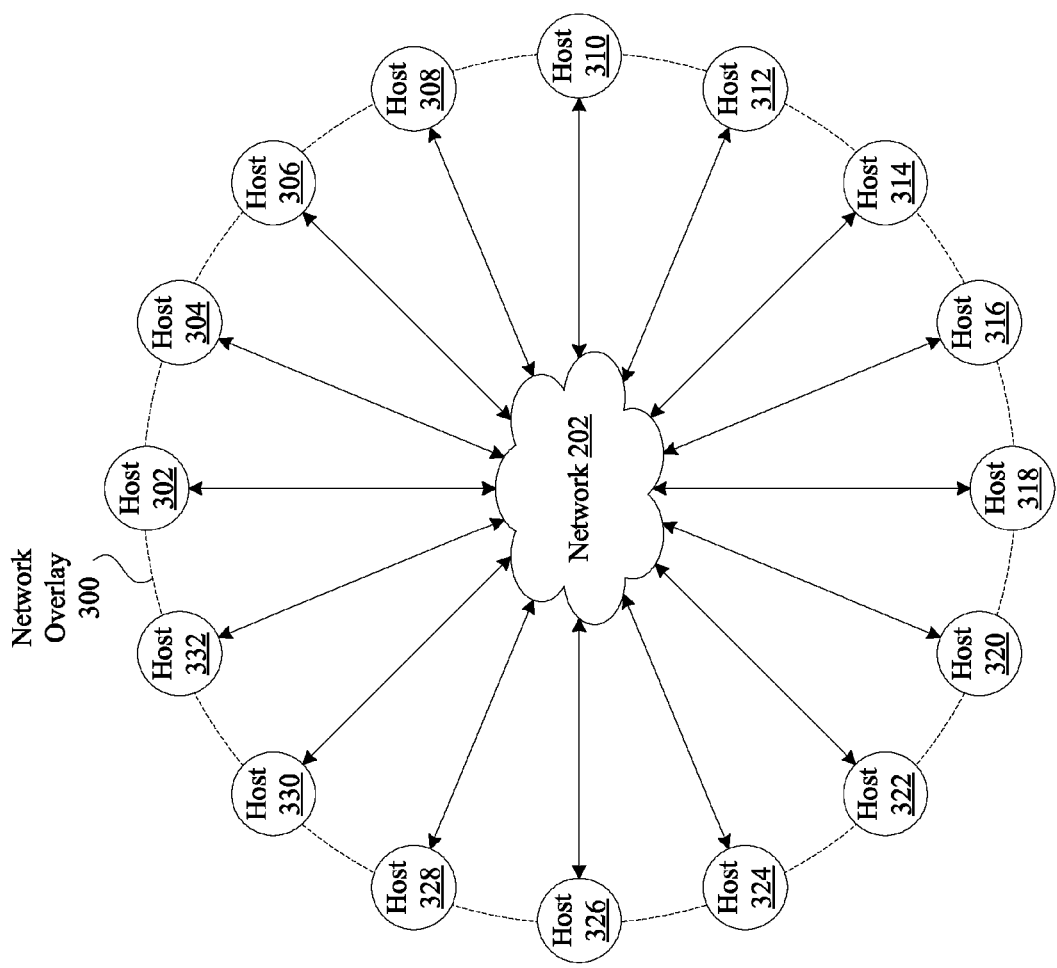

DECENTRALIZED MANAGEMENT OF VIRTUALIZED HOSTS

BACKGROUND

Centralized management software for a virtualized computer system is used to monitor and balance loads across hardware resources, such as host systems and storage arrays. FIG. 1 depicts a conventional virtualized computer system 100 that includes a centralized virtual machine (VM) manager 102, host systems 122-124, and storage arrays 106-1, 106-N. One example of VM manager 102 is VMware vSphere® by VMware, Inc. of Palo Alto, Calif. As shown, host systems 122-124 are connected with storage arrays 106-1, 106-N via a storage network 104, and are also connected to VM manager 102 via network 120. VM manager 102 manages virtualized computer system 100 and is in communication with at least host systems 122-124 and storage arrays 106-1, 106-N. There may be any number of host systems included in virtualized computer system 100. Each host system may comprise a general purpose computer system having one or more applications, virtual machines, or other entities that access data stored in storage arrays 106-1, 106-N. For example, host systems 122-124 include VMs 125-127 that access VM data in the storage arrays 106-1, 106-N, respectively. Storage arrays 106-1, 106-N each include storage devices 112.

VM manager 102 is able to effectively manage the host systems and storage arrays when the number of host systems and/or storage arrays included in the virtualized computer system 100 is relatively, small on the order of dozens. However, when the number of host systems and/or storage arrays included in the virtualized computer system 100 becomes very large, the management of these hardware resources becomes quite inefficient. For example, a cloud-based computing system may include thousands of hardware resources that provide the physical infrastructure for a large number of different computing operations. In such cloud-based computing systems, proper load balancing across the hardware resources is critical to avoid computing bottlenecks that can result in serious problems, including a reduction in speed of VMs executing on a host system that is overloaded, potential data loss when no more free space is available in a storage array, and the like. Accordingly, the complexity and inefficiency of a centralized approach to load balancing does not perform well when a large number of hardware resources are being managed.

One approach to minimizing the problems associated with a centralized management approach involves increasing the hardware capabilities of VM manager 102, e.g., by executing VM manager 102 on more powerful hardware. However, even when executing VM manager 102 on very powerful hardware, communication delays and execution costs associated with hardware resources sending a large volume of statistics to VM manager 102, combined with the subsequent load balancing computation responsibilities thereof, still result in serious performance problems. In virtualized computing, a load balancing operation has a time complexity of roughly O (number of VMs*number of host systems). In a typical example involving approximately 64 host systems and 1,000 VMs, VM manager 102 can take up to several minutes to perform load balancing operations. Moreover, user-initiated operations such as VM power-ons are queued by VM manager 102 if they arrive during an in-progress load balancing operation, which presents unacceptable delays to the user when the load balancing operation takes a long time to complete (e.g., on the order of minutes). Furthermore, the centralized management approach continues to be vulnerable to VM manager 102 being a single point of failure.

SUMMARY

A method for dividing computing resources of a plurality of host computers among a plurality of virtual machines (VMs), according to an embodiment, includes the steps of calculating one or more VM entitlement factors based on entitlement data received from one or more host computers, determining an optimized VM entitlement factor that causes a sum of VM entitlement values to be associated with a total capacity of the plurality of host computers, and causing each host computer in the plurality of host computers to calculate a VM entitlement value for each VM executing on the host computer based on the optimized VM entitlement factor.

A method for load balancing virtual machines (VMs) across a plurality of host computers, according to an embodiment, includes the steps of calculating a normalized entitlement value for a host computer generating a utilization average by aggregating the normalized entitlement value with normalized entitlement values of other host computers included in the plurality of host computers, determining that the normalized entitlement value exceeds the utilization average beyond a threshold amount, identifying one or more host computers capable of executing one or more VMs executing on the host computer based on data received from the one or more host computers, identifying one or more host computers to transfer the one or more VMs, and transferring the one or more VMs to at least one of the one or more identified host computers.

A method for performing an initial placement of a virtual machine (VM) in a host computer included in a plurality of host computers, according to an embodiment, includes the steps of receiving a request to power-on the VM, identifying one or more host computers that are capable of executing the VM based on data received from the one or more host computers, selecting from the one or more host computers a host computer to power-on the VM, and powering-on the VM in the selected host computer.

Further embodiments provide a non-transitory computer-readable storage medium that includes instructions for causing a computer system to carry out one or more of the methods set forth above.

BRIEF DESCRIPTION OF THE DRAWINGS

FIGS. 3A, 3B and 3C illustrate a network overlay and a multicast tree, according to various embodiments.

DETAILED DESCRIPTION

Figure 1:
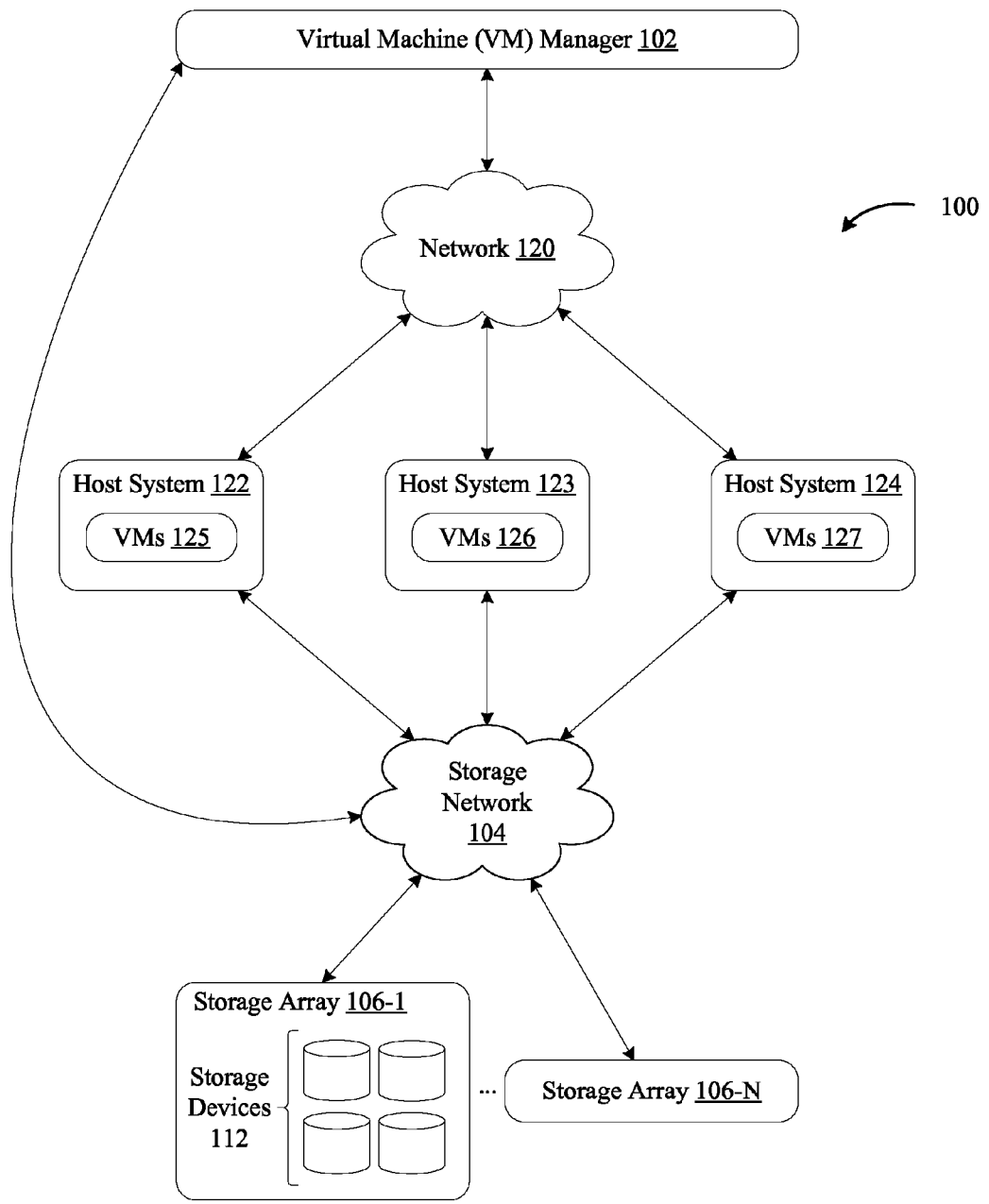
FIG. 1 depicts a block diagram of a centrally-managed virtualized computer system, according to the prior art.
Figure 2:
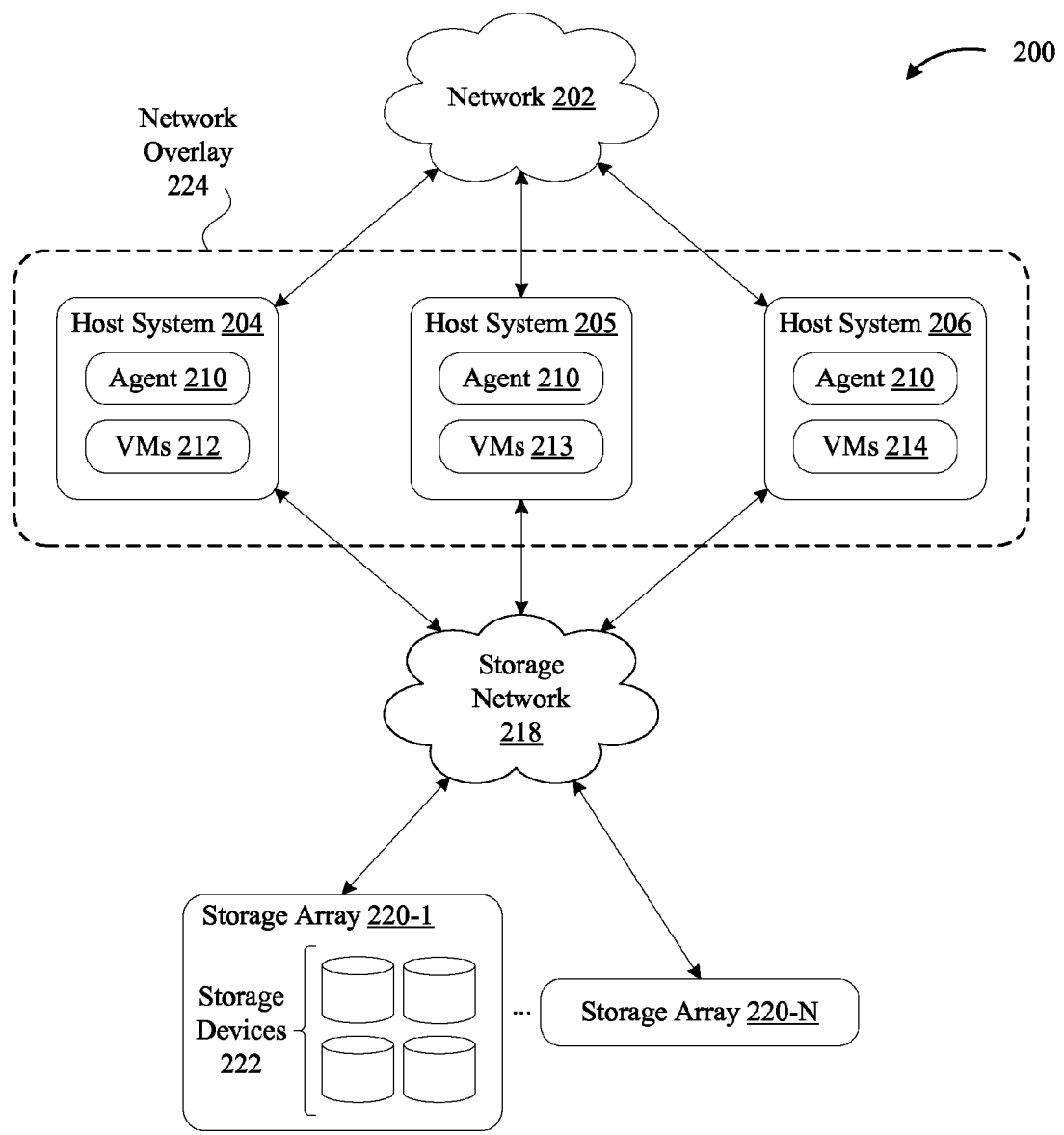
FIG. 2 depicts a block diagram of a virtualized computer system in which one or more embodiments may be implemented.

FIG. 2 depicts a block diagram of a virtualized computer system 200 in which one or more embodiments may be implemented. As shown, virtualized computer system 200 does not include a centralized manager, such as VM manager 102 shown in FIG. 1. Instead, virtualized computer system 200 includes host systems 204-206 and storage arrays 220, where host systems 204-206 collectively manage virtualized computer system 200 in a decentralized manner. As shown, host systems 204-206 are coupled to storage arrays 220 via a storage network 218, and communicate with one another via network 202. A collection of host systems, such as host systems 204-206, is also referred to herein as a "cluster." Again, there may be any number of host systems included in virtualized computer system 200, each of which may comprise a general purpose computer system having one or more applications, virtual machines, or other entities that access data stored in storage arrays 220. For example, host systems 204-206 may include VMs 212-214, respectively. Storage arrays 220 each include storage devices 222.

In some embodiments, VMs 212-214 run on top of a hypervisor (not shown), which is a software interface layer that may execute on each host system and enable sharing of the hardware resources of the host system. The hypervisor may run on top of an operating system executing on the host system or directly on hardware components of the host system. Each VM includes a guest operating system and one or more guest applications. The guest operating system is a master control program of the VM and forms a software platform on top of which the guest applications run. As also shown, an agent 210 is included in each of host systems 204-206. Information associated with the virtualization settings and configuration of host systems 204-206 and VMs 212-214 included therein is communicated between host systems 204-206 via network overlay 224 using network 202, as described below in greater detail in FIGS. 3A-3C and FIGS. 4A-4B.

Host systems 204-206 communicate with storage arrays 220 via storage network 218 and coordinate storage of VM data files, such as VM configuration files and virtual disks, within storage devices 222 included in each of storage arrays 220. In one embodiment, storage arrays 220 are managed by a computer program executing on one or more processors included in, e.g., a computer system configured to manage storage arrays 220. Each storage array 220 may also include a plurality of storage processors. Both storage network 218 and network 202 may be a wide area network, a local area network, or a network hosting a protocol especially suited for storage arrays, such as Fibre Channel, iSCSI, HyperSCSI, etc. For example, storage network 218 may comprise one or more of Fibre Channel switches. Each of storage arrays 220 may be any type of storage array such as a network-attached storage (NAS) filer. While storage arrays are typically made up of a plurality of disks, it should be recognized that as prices for solid-state non-volatile storage devices continue to decrease, non-volatile storage is increasingly taking the place of rotating disk storage media. The use of the term, "disk" herein, should therefore not be construed as limited only to rotating disk storage media, but also what is become known as solid state disks, or "SSDs."

As described herein, embodiments provide a technique for effectively managing virtualized computing systems with an unlimited number of hardware resources. Because embodiments do not include a centralized manager, host systems included in virtualized computer system 200 are instead organized into a scalable, peer-to-peer (P2P) network in which host systems arrange themselves into a network overlay to communicate with one another. Some common examples of existing P2P networks that may be implemented are Chord, Pastry, Tapestry, and Bamboo.

A desirable property of network overlays is that they provide O(log(n)) message routing between host systems while merely requiring that each node in the network overlay maintains a small, constant number of routing table entries. Failures of hardware resources within virtualized computer system 200, such as host system power-offs and network interface errors, are automatically detected by the host systems, and may be automatically corrected by repopulating routing table entries. Thus, these overlays provide a scalable, decentralized, and way of managing high churn rates caused by continual power-ons and power-offs of host systems included in a large virtualized computer system.

FIG. 3A illustrates a network overlay 300, according to one embodiment. As shown, network overlay 300 is logically constructed on top of an underlying physical network, i.e., network 202 described above in FIG. 2. In one embodiment, host systems 302-332 are organized in network overlay 300 according to a circular 128-bit address space, where each host system 302-332 assigns itself a random 128-bit address when joining network overlay 300. As described above, each host system keeps a constant-sized routing table that is updated based on host systems joining and leaving network overlay 300. The main primitive function provided to host systems 302-332 by network overlay 300 is route(ID host_ID, Message M), which routes a message M from the host system calling the route primitive to a host system with a host_ID closest to the host_ID in the 128-bit address space. For example, a packet routed to a host_ID of "0x12ab3de7854" can be delivered to a host system with an address that is closest to this host_ID in the 128-bit address space, e.g., a host with a host_ID of "0x12ab3de7862."

Host systems 302-332 keep themselves organized within network overlay 300 by joining and leaving different groups within network overlay 300, referred to hereinafter as "multicast trees." One example technology that enables multicast trees to be constructed within network overlay 300 is SCRIBE, which allows host systems to be organized into a multicast tree based on a common interest in the same "topic." Specifically, there are two main primitives provided by SCRIBE: subscribe(topicID tid), and publish (topicID tid, Message M). The subscribe primitive allows a host system to join a multicast tree associated with the topicID tid, while the publish primitive allows a host system to send the message M to other host systems that are included in a multicast tree associated with the topicID tid. The topicID is a number in the 128-bit address space of network overlay 300, and can be computed by, for example, using a hash function on the name of the topic, e.g., hash("Topic Name").

Figure 3B:
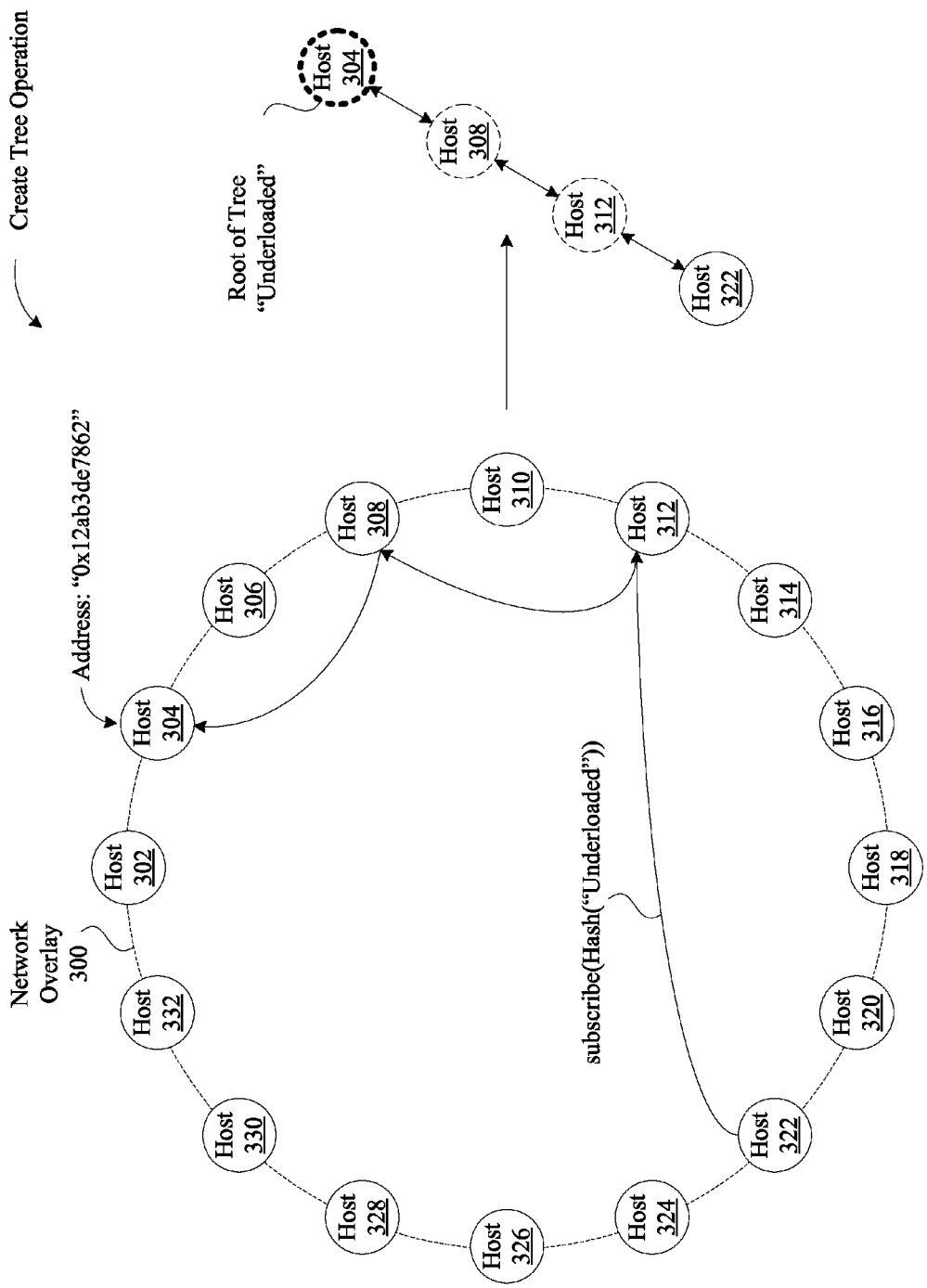

In one example illustrated in FIG. 3B, host 322 determines that the hardware resources included in host 322, e.g., processors and random access memory (RAM), are not being utilized to their full capacity. Accordingly, agent 210 requests on behalf of host 322 to join a multicast tree with the topicID "Underloaded" by calling the primitive subscribe(Hash("Underloaded")). In the example illustrated in FIG. 3B, no "Underloaded" multicast tree initially exists within network overlay 300. Based on the routing table information associated with host 322, the subscription message is first routed to host 312, then to host 308, and finally to host 304, where host 304 has a host_ID that is closest to the result of Hash("Underloaded"). Such routing is merely an example and is based on a routing table that causes the subscription message to be routed in the way illustrated in FIG. 3B.

Each host system that interacts with the subscription message is also added to the "Underloaded" multicast tree. Host systems that do not explicitly subscribe to a particular multicast tree with a subscribe( )message are nevertheless included in the multicast tree as a result of routing a subscription message and serve as message handlers (referred to herein as "forwarders").

Figure 3C:
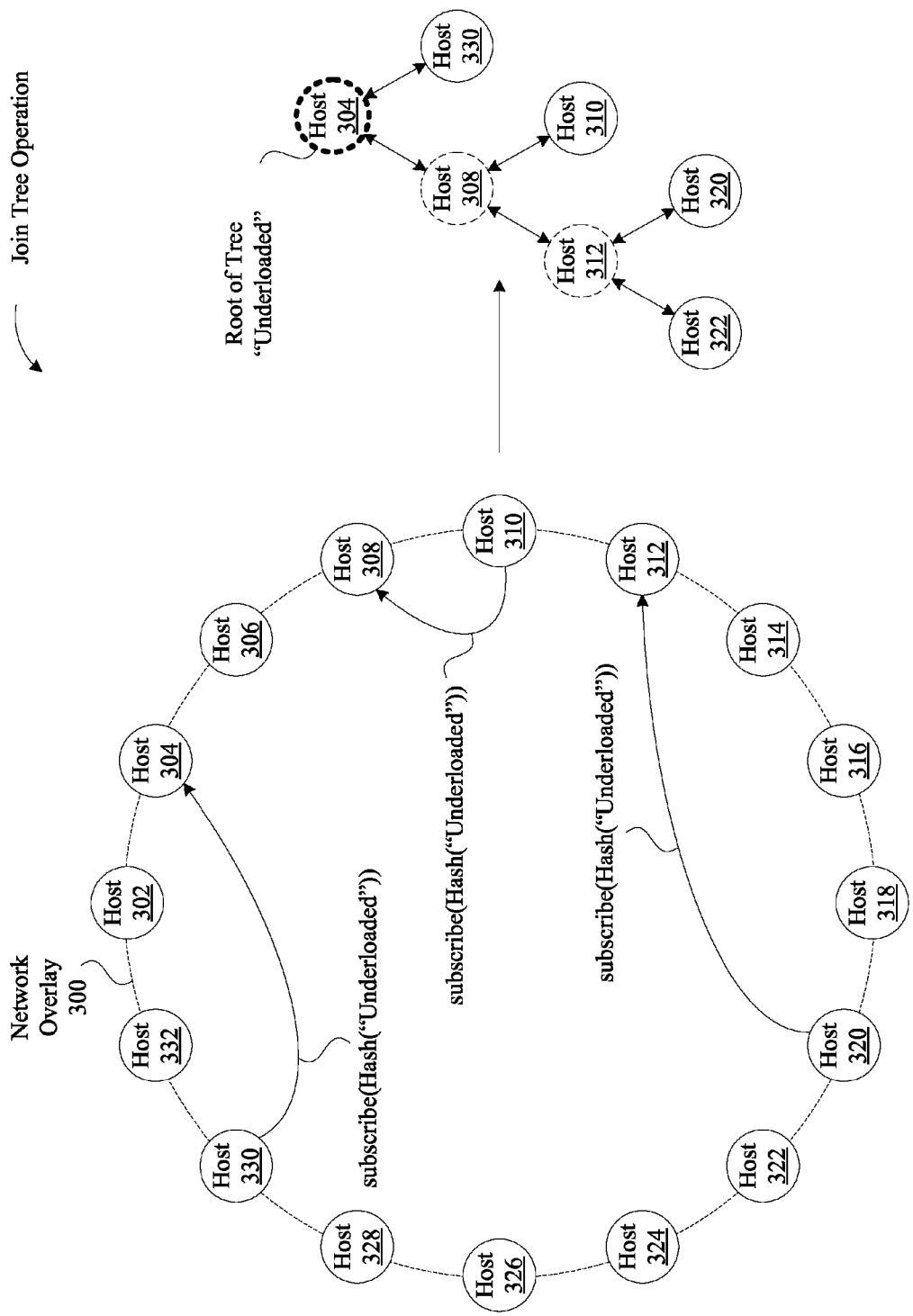

FIG. 3C illustrates three additional host systems 310, 320, 330 subscribing to the "Underloaded" multicast tree. As shown, host 312 receives the subscribe message from host 320 and, because host 312 is already included in the "Underloaded" multicast tree, host 320 is added to the "Underloaded" multicast tree by host 312 without requiring that the message be forwarded to a root of the "Underloaded" multicast tree, host 304. As also shown, host 320 and host 330 are added to the "Underloaded" multicast tree in a similar fashion, which results in the "Underloaded" multicast tree that includes four "member" host systems that explicitly subscribed to be included in the multicast tree (i.e., hosts 310, 320, 322, and 330) and three "forwarder" host systems that are included in the multicast tree as a result of being along the routing path from a host that explicitly subscribed to the multicast tree and the root of the multicast tree (i.e., hosts 304, 308, 312).

The foregoing techniques enable host systems 302-322 to be organized according to shared similarities, which can provide for more efficient communication between hosts in the virtualized computer system 200. For example, an overloaded host system only needs to direct a query message to the "Underloaded" multicast tree via the publish primitive to illicit a response from one or more host systems included in the "Underloaded" multicast tree that are capable of receiving additional workload, which is more efficient than directing a similar message to all host systems included in virtualized computer system 200.

Multicast trees also enable aggregation of statistics between host systems using primitives provided by network overlays. Such statistics are used by a technique for determining "entitlements" of VMs executing within each host system. Based on these values, load balancing and power management operations, which are discussed below in conjunction with FIGS. 4-8, are implemented using these aggregated statistics and allow host systems to discover and correct imbalances in virtualized computer system 200 in a decentralized manner.

VM entitlements may be derived according to a plurality of techniques. For example, vSphere® by VMware Inc. of Palo Alto, Calif. provides hardware resource controls that allow administrators to express VM allocations in terms of relative VM importance and/or absolute service rates. Relative VM importance may be established by assigning a VM a particular number of shares, which are expressed as abstract numeric values. More specifically, a VM is entitled to consume resources in virtual computer system 200 proportional to the VM's share allocation, and the VM is guaranteed a minimum resource fraction equal to the VM's fraction of the total number of shares that are assigned to other VMs included in virtual computer system 200. As a result, VM allocations degrade gracefully when virtualized computer system 200 becomes overloaded, and VMs benefit proportionally from extra hardware resources that are available in virtual computer system 200 when virtual computer system 200 is underloaded.

Absolute VM service rates may be established by assigning to a VM a reservation and a limit, where the limit is greater than or equal to the reservation. Specifically, a reservation may be used to specify a minimum guaranteed amount of hardware resources that the VM is to receive when executing, i.e., a lower bound that applies even when virtual computer system 200 is heavily overcommitted. Reservations are expressed in concrete, absolute units, such as megahertz (MHz) for central processing unit (CPU) time, and megabytes (MB) for memory space. To ensure that all reservations are met, an admission control policy prevents additional VMs from powering-on if the sum of all reservations of VMs in virtual computer system 200 exceeds a total capacity of virtual computer system 200.

Conversely, a limit may be used to specify an upper bound on the amount of hardware resources that a VM is allowed to consume, even when virtualized computer system 200 is undercommitted. In this way, a VM is prevented from consuming more than the VM's limit, even when hardware resources in virtualized computer system 200 become idle as a result. Like reservations, limits are also expressed in concrete absolute units, such as MHz and MB.

An entitlement of a VM is based on the VM's shares, reservation, and limit settings, along with properties associated with hardware resources included in virtualized computer system 200. A VM's entitlement for a hardware resource in virtualized computer system 200 is primarily based on the VM's shares for the hardware resource, relative to the shares of all other VMs contending for the same hardware resource. In one example, suppose VM A and B are actively competing for a hardware resource, for which VM A is assigned three times as many shares as VM B. In this case, their 3-to-1 share ratio entitles VMs A and B to consume 75% and 25% of the hardware resource, respectively.

However, as described above, a VM's entitlement is also bounded by the VM's reservation and limit. For example, if VM A is assigned a limit equal to 50% of the hardware resource, then the resulting entitlements for VMs A and B each becomes 50%. If VM B is also assigned a reservation of 60% of the resource, then the entitlements for VMs A and B become 40% and 60%, respectively, despite the higher share value that VM A holds in comparison to VM B.

Techniques for computing VM entitlements, which is referred to as "divvying," are discussed in detail below in FIGS. 4-6. One aspect of divvying is to provide mechanisms for host systems to independently compute cluster-wide statistical data. For example, a total capacity of a cluster a quantity used to calculate VM entitlements. A cluster's total capacity is a dynamic value and changes as host systems join and leave the cluster. Another quantity used for VM entitlement calculations is the sum of shares ($S_i$) of all VMs i executing within the cluster. As VMs are powered on and off in virtual computing system 200, $S_i$ may change rapidly.

Multicast trees may be used to aggregate statistics between host systems using primitives provided by multicast trees, referred to herein as "aggregation trees." One such aggregation tree exists for each attribute that is being aggregated across the cluster. For example, a multicast tree may be constructed for each attribute using, e.g., topicID=hash("attribute_name").

Figure 4A:
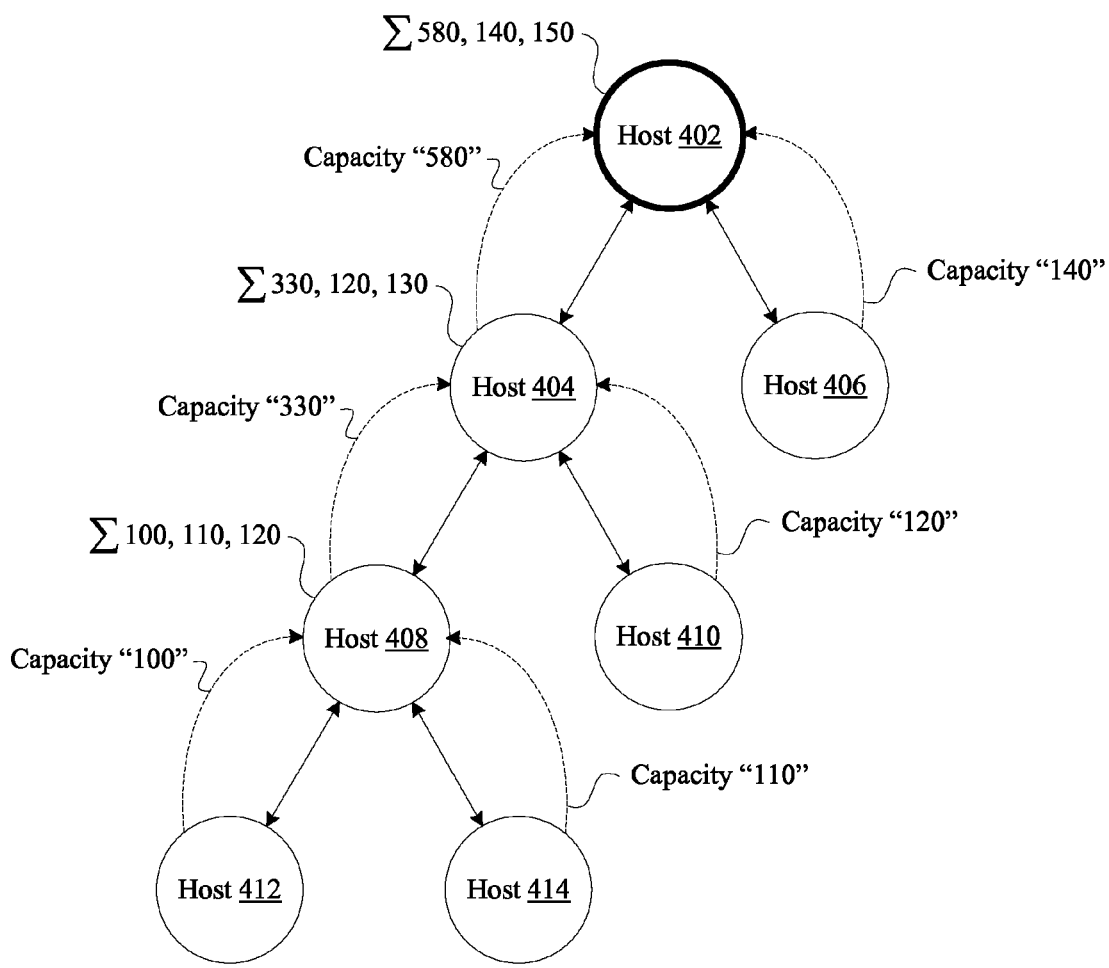
FIGS. 4A and 4B illustrate an aggregation of a total capacity of a cluster of host systems, according to one embodiment.
Figure 4B:
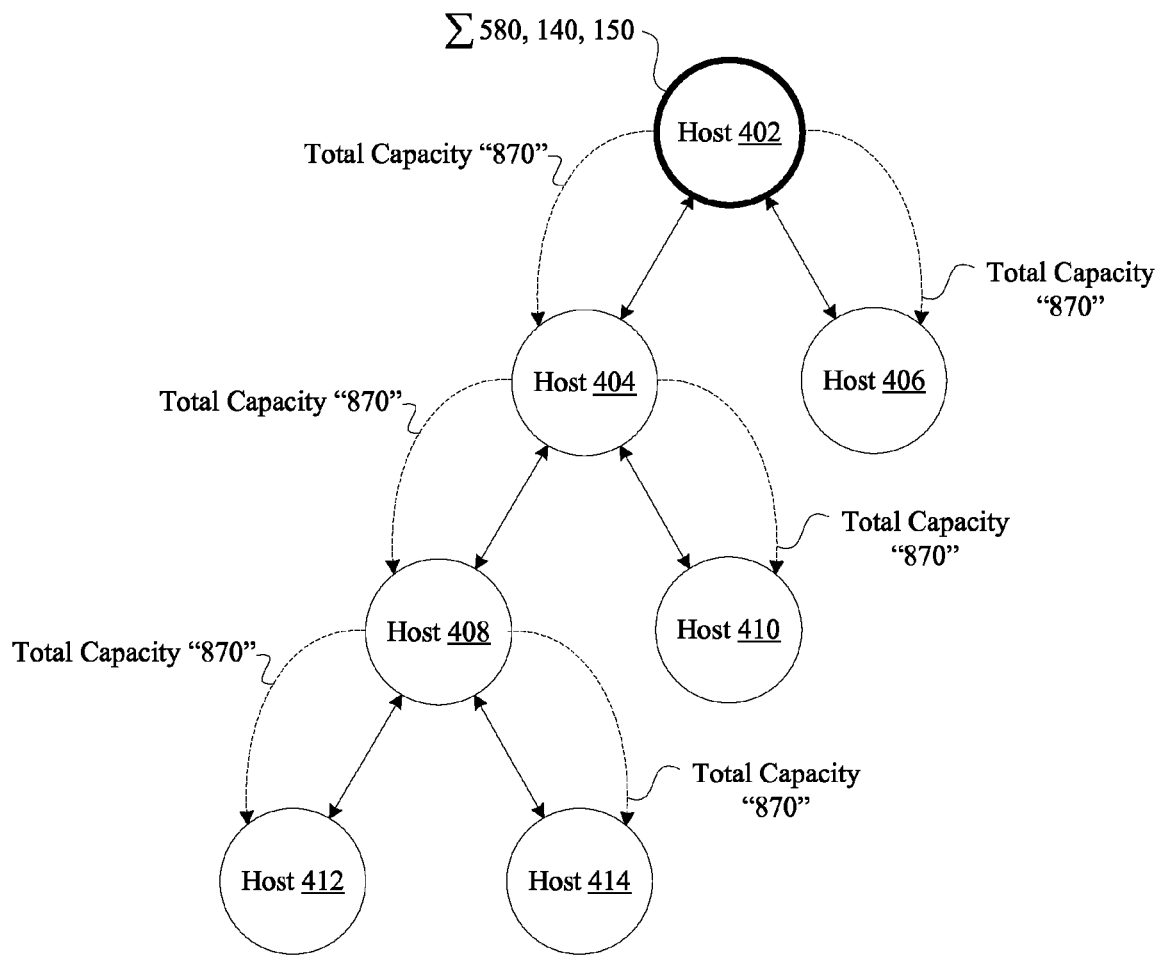

FIGS. 4A-4B illustrate an aggregation of a total capacity of a cluster of host systems, according to one embodiment. As shown, host systems 402, 404, 406, 408, 410, 412, 414 are organized into an aggregation tree. Each host system included in the tree reports its capacity value to its parent in the tree. For example, host 412 and host 414 report capacity values of "100" and "110," respectively, to host system 408, which sums its capacity value (i.e., "120") and the capacity values of host 412 and host 414. This process continues up the tree until a root of the tree, i.e., host 402, sums its capacity value (i.e., "150") with the reported capacity values "580" and "140" from the child nodes. Host 402 then reports a total capacity value of "870" to down the tree to the children of host 402, which propagate the total capacity down the tree, as illustrated in FIG. 4B. Host systems may be configured to automatically report their capacities periodically such that each host system included in the tree maintains accurate knowledge of the total capacity value of the cluster.

As described above, embodiments support assignment of shares, reservation and limit values for each VM included in virtualized computer system 200, and further provide techniques whereby information may be aggregated between hardware resources included therein. The following techniques enable VM entitlements to be calculated by host systems in a decentralized manner.

The demand $d_i$ of a VM can be estimated as the VM's fifteen minute average demand+$\alpha$ % extra room to accommodate bursty loads that are often experienced in production environments, where $\alpha$ is configurable. The demand d, value is used to automatically adjust the limit of the VM according to the following equations for a VM $V_i$:

$$d_i = MAX(d_i, R_i) \quad \text{(Equation 1)}$$

$$L_i = MIN(L_i, d_i) \quad \text{(Equation 2)}$$

Again, the entitlement $E_i$ of each VM i is either proportional to its shares, equal to its reservation if its share-based allocation would be lower, or equal to its limit if its share-based allocation would be higher. Thus, at the end of the divvying process, the entitlement $E_i$ of some VMs may be bounded by their limits (referred to as "max-limited VMs"), the entitlement $E_i$ of some VMs may be bounded by their reservations (referred to as "min-limited VMs"), and the entitlement $E_i$ for the remaining VMs will be proportional to their shares (referred to as "share-limited VMs"). Thus, assuming fully utilized hosts in a cluster, $\Sigma E_i = C$, where C is a total capacity of the cluster.

A quantity referred to as an entitlement-per-share (EPS) for each VM i is denoted by P such that $$P_i = \frac{E_i}{S_i}.$$

For min-limited VMs, $E_i = R_i$, whereas, for max-limited VMs, $E_i = L_i$. For the remaining share-limited VMs, the remaining capacity of the cluster will be divided among them strictly proportional to their shares. For this class of VMs, the $P_i$ would be constant, because the EPS is not biased by share-limited VM's reservations or limits. Therefore, for share-limited VMs, $P_i = \rho$, where $\rho$ is a cluster-wide constant value. In other words, all VMs for which the entitlement is strictly proportional to their shares have equal $$P_i = \rho = \frac{E_i}{S_i} \text{ values,}$$

and by simple algebra, $E_i = S_i * \rho$. Combining each of the three cases yields one comprehensive equation for dynamic VM entitlement:

$$E_i = MIN(MAX(R_i, S_i * \rho), L_i) \quad \text{(Equation 3)}$$

Assuming an overcommitted cluster with capacity C and a set of VMs, there exists one $\rho$ value for share-limited VMs that result in $\Sigma E_i = C$. For example, consider Table 1 where ten VMs are included in a cluster under two different capacities:

TABLE 1

|      | $S_i$ | $R_i$ | $L_i$ | $E_i @ C = 6000$ | $E_i @ C = 6600$ |
|------|-----|-----|-----|-----|-----|
| VM1  | 10 | 950 | ∞   | 950 | 950 |
| VM2  | 10 | 900 | ∞   | 900 | 900 |
| VM3  | 10 | 850 | ∞   | 850 | 850 |
| VM4  | 10 | 650 | ∞   | 650 | 733 |
| VM5  | 10 | 550 | ∞   | 550 | 733 |
| VM6  | 10 | 100 | ∞   | 550 | 733 |
| VM7  | 10 | 100 | 700 | 550 | 700 |
| VM8  | 10 | 100 | 400 | 400 | 400 |
| VM9  | 10 | 100 | 350 | 350 | 350 |
| VM10 | 10 | 100 | 250 | 250 | 250 |
| Sum  |    | 4400 | 1700 | 6000 | 6600 |

In Table 1, the $S_i$, $R_i$, and $L_i$ columns represent share, reservation and limit values of each VM i, respectively, while the $E_i@$ C=6000 column represents entitlement values of each VM i when the cluster has a capacity of 6000 MHz, and the $E_i@$ C=6600 column represents entitlement values of each VM i when the cluster has a capacity of 6600 MHz. As is described in further detail below, the cluster capacity of 6000 MHz is fully utilized when $\rho=55$, and VMs 1-4 receive a high normalized entitlement because their $R_i$ is higher than what their shares alone would have provided them. In other words, their $$R_i > S_i * \frac{C}{\Sigma S_i}.$$

In contrast, VMs 8-10 have low normalized entitlements because their user-specified limits are lower than what strict proportional sharing would have achieved $$\left(\text{i.e., } L_i < S_i * \frac{C}{\Sigma S_i}\right).$$

The remaining VMs 5-7 have identical $P_i = \rho = 55$ values since their entitlement is not affected by their reservations or their limits, i.e., they are share-limited VMs. Similarly, when the cluster has a total capacity value of 6600 MHz, $\rho = 73$ for VMs 4-6.

Note that the final value of $\rho$ for share-limited VMs cannot be more than a $$\text{maximum}\left(\frac{L_i}{S_i}\right)$$

of all VMs in the cluster. Since $E_i = S_i * \rho$ for share-limited VMs and the $E_i$ of any VM cannot be more than the $$\text{maximum}(L_i), \frac{E_i}{S_i}$$

is bounded by the $$\text{maximum}\left(\frac{L_i}{S_i}\right).$$

Similarly, the entitlement of any VM cannot be less than a minimum ($R_i$) in the cluster. Hence, $$\frac{E_i}{S_i}$$

or ρ cannot be less than $$\text{minimum}\left(\frac{R_i}{S_i}\right)$$

in the cluster. Also, ρ cannot be less than $$\frac{C - \sum R_i}{\sum S_i},$$

where C is the total cluster capacity and $\Sigma R_i$ is the sum of all VM reservations in the cluster. More specifically, when $C-\Sigma R_i$ is provided to all the VMs in the cluster, and no VM specifies a reservation, each VM will receive an entitlement of $$\frac{C - \sum R_i}{\sum S_i} * S_i.$$

If some VMs become max-limited, then the share-limited VMs would receive larger entitlements. Hence, the $$\frac{R_i}{S_i}$$

for share-based VMs cannot be less than $$\frac{C - \sum R_i}{\sum S_i}.$$

Accordingly, a lower bound for ρ is $$\text{MAX}\left(\frac{C - \sum R_i}{\sum S_i}, \text{minimal}\left(\frac{R_i}{S_i}\right)\right).$$

The cluster $$\text{maximum}\frac{L_i}{S_i}$$

is recalculated by and made known to host systems included in the cluster each time a host system or VM is added to or removed from the cluster. $\Sigma S_i$ and $\Sigma R_i$ are also kept up-to-date within the cluster, by, e.g., creating different multicast trees for reservations, limits, and shares of VMs. Thus, constraints may be established on ρ to pick initial upper and lower bounds to execute a binary search for a normalized ρ, as illustrated by the pseudocode in Algorithm 1:

---
Algorithm 1: Centralized Divvy Binary Search
---

LowerBound ← MAX$\left(\frac{C - \Sigma R_i}{\Sigma S_i}, \text{Minimal}\left(\frac{R_i}{S_i}\right)\right)$;

UpperBound ← Maximal$\left(\frac{L_i}{S_i}\right)$;

Binary Search for ρ in [LowerBound, UpperBound]
until $\Sigma E_i = C$

---

Figure 5:
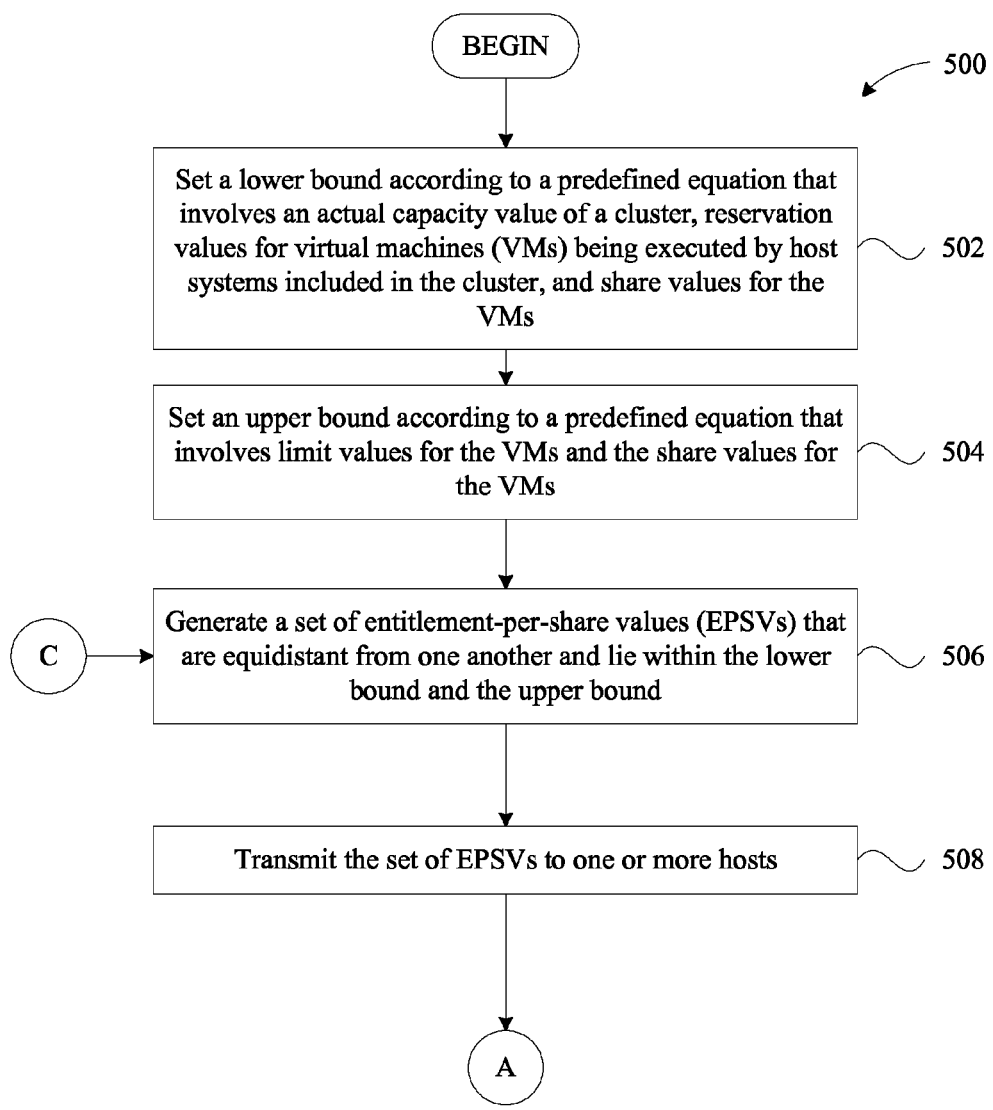
FIG. 5 is a flow diagram of method steps for divvying resources to VMs included in virtual computer system using a binary searching technique, according to one embodiment.
Figure 5:
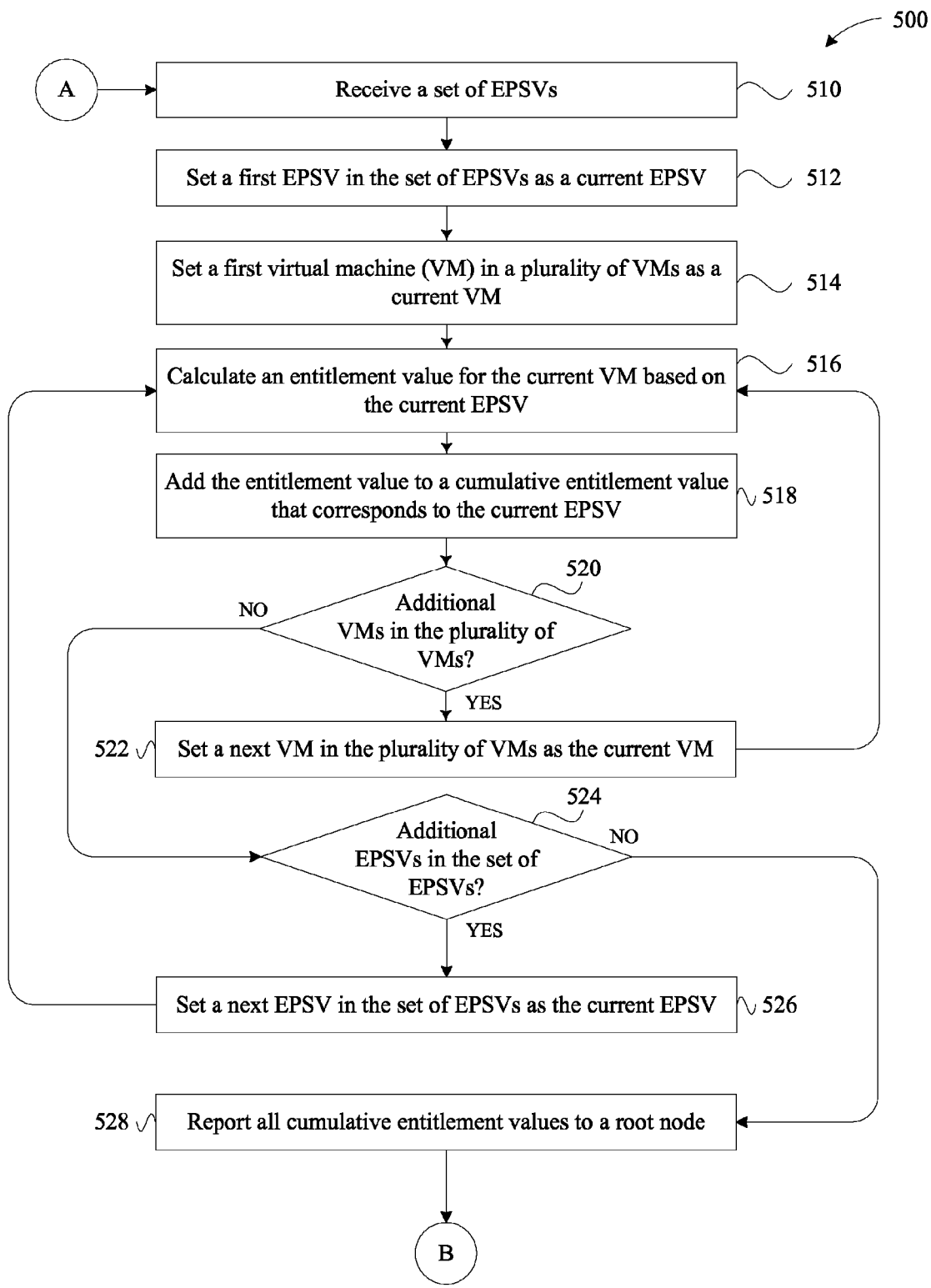
Figure 5:
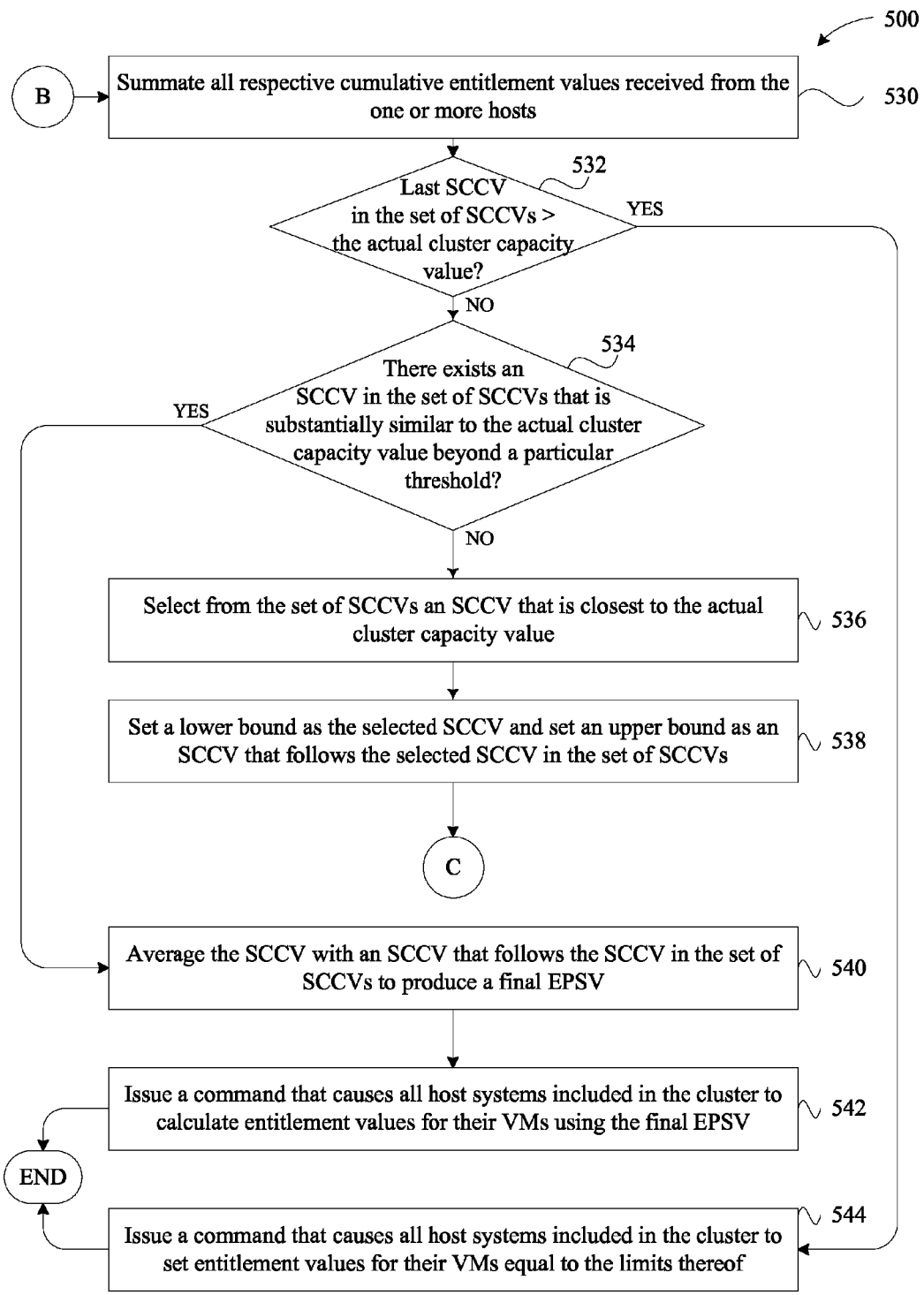

FIG. 5 is a flow diagram of method steps 500 for divvying resources to VMs included in virtual computer system 200 using a binary searching technique, according to one embodiment. Method steps 500, when executed, identify a ρ in Equation 3 such that $\Sigma E_i = C$ by attempting different values of ρ for the share-limited VMs until $\Sigma E_i = C$. Algorithm 2 is pseudocode for method steps 502-526, while Algorithm 3 is pseudocode for method steps 528-544.

As is described in further detail below, in method 500, a range of ρ is quantized between calculated upper and lower bounds into, e.g., two hundred fifty-six values (denoted as $X^j$, j=1 ... 256) that are known to each host system in the cluster. Then, all host systems simulate each of the $X^j$ values to determine their own portions ($Y^j$) of a simulated cluster capacity. Next, the two hundred fifty-six values of each host system are respectively aggregated together to result in a value $C^j$, where $C^j$ is a simulated cluster capacity value. Again, each host system is also aware of the actual cluster capacity C. The host systems subsequently narrow in on the closest $C^k$ to the actual C and perform a binary search down between $X^k-1$ and $X^k$.

---
Algorithm 2: Distributed Divvy $1^{st}$ Phase
---

LowerBound ← MAX$\left(\frac{C - \Sigma R_i}{\Sigma S_i}, \text{Minimal}\left(\frac{R_i}{S_i}\right)\right)$;

UpperBound ← Maximal$\left(\frac{L_i}{S_i}\right)$;

foreach $X^j$ in ($X^1, X^2 ... X^{256}$) do
  foreach VM $v_i$ on the host do
    $Y^j$ += MIN(MAX($R_i$, $S_i * X^j$), $L_i$);

---

---
Algorithm 3: Distributed Divvy $2^{nd}$ Phase
--- if $C^{256} < C$ then
  All VMs get the Max ;
  foreach VM $v_i$ on the host do
    $E_i \leftarrow L_i$;

-continued

Algorithm 3: Distributed Divvy $2^{nd}$ Phase

```
    else
        Find $C^k$ and $C^{k+1}$ such that $C^k \le C \le C^{k+1}$;
        LowerBound ← $C^k$;
        UpperBound ← $C^{k+1}$;
        Repeat Algorithm 4 once or twice more to get
        more accurate $C^k$ and $C^{k+1}$;
        ρ ← $(X^k + X^{k+1})/2$;
        foreach VM $v_i$ on the host do
            $E_i$ ← MIN(MAX($R_i, S_i * ρ$), $L_i$);
```

As shown, method 500 begins at step 502, where a host system acting as a root of an aggregation tree sets a lower bound according to a predefined equation that involves a true capacity value of the cluster, reservation values for virtual machines (VMs) being executed by host systems included in the cluster, and share values for the VMs. At step 504, the root host system sets an upper bound according to a predefined equation that involves limit values for the VMs and the share values for the VMs.

As described above, the final value of ρ for share-limited VMs cannot be more than the $$\text{maximum}\left(\frac{L_i}{S_i}\right)$$

of all VMs in the cluster. Accordingly, $$\text{maximum}\left(\frac{L_i}{S_i}\right)$$

is set as the initial upper bound in the binary search for ρ. Moreover, because ρ also cannot be less than $$\frac{C - \sum R_i}{\sum S_i}$$

or the $$\text{minimum}\left(\frac{R_i}{S_i}\right),$$

maximum of these two equations is set as the initial lower bound in the binary search for ρ.

At step 506, the root host system generates a set of entitlement-per-share values (EPSVs) that are equidistant from one another and lie within the lower bound and the upper bound. In one embodiment, the range between the lower bound and the upper bound is divided into two hundred fifty-six equidistant values $X^j$, where each $X^j$ in ($X^1, X^2 \ldots X^{256}$) represents a potential value of ρ. At step 508, the root host system transmits the set of EPSVs to one or more hosts included in the cluster.

Each host system computes the simulated cluster capacity $C^j$ the host system needs ($Y^j$) if the final value of ρ of share-limited VMs is $X^j$. Thus, each host in the cluster carries out method steps 510-526 and computes a $Y^j(X^j), j=1 \ldots 256$ assuming that $X^j$ is the correct cluster-wide ρ. In other words, the local Y(X) computation is $\Sigma E_i$ given a particular ρ, where $E_i$ is computed as MIN(MAX($R_i, S_i * p$), $L_i$) (Equation 3).

Specifically, at step 510, each host system receives the set of EPSVs generated by the root host system at step 506. At step 512, each host system sets a first EPSV in the set of EPSVs as a current EPSV. At step 514, each host system sets a first VM of a plurality of VMs executing thereon as a current VM. At step 516, each host system calculates an entitlement value for the current VM based on the current EPSV. At step 518, each host system adds the entitlement value to a cumulative entitlement value that corresponds to the current EPSV. At step 520, each host system determines whether additional VMs in the plurality of VMs exist. If so, then at step 522, the host system sets a next VM in the plurality of VMs as the current VM. Otherwise, at step 524, each host system determines if there are additional EPSVs in the set of EPSVs. If so, at step 526, the host system sets a next EPSV in the set of EPSVs as the current EPSV. Otherwise, method 500 proceeds to step 528.

At step 528, each host reports the cumulative entitlement values to the root host system, which are summed up in a distributed way across the host systems included in the cluster according to step 530. Table 2 illustrates how each host sends $Y^1 \ldots Y^{256}$ to be summed with the summed with $Y^1 \ldots Y^{256}$ values calculated by the other host systems included in the cluster. For example, the $Y^1$ values calculated by each of the host systems are summed to calculate $C^1 = \Sigma Y^1$. Similarly, the $Y^2$ values calculated by each of the host systems are summed to calculate $C^2 = \Sigma Y^2$, and so on. Accordingly, for each $X^j$, a corresponding sum $C^j$ is obtained. Thus, the sum C is the cluster capacity required if $ρ = X^j$.

TABLE 2

Distributed summation of host level $Y^j$'s

| Attribute | $Y_h = \Sigma E_i$ on host h | Cluster Function $\Sigma$ |
|---|---|---|
| $X^1$ | $Y_1^1 \ldots Y_2^1 \ldots Y_3^1 \ldots$ | $C^1$ |
| $X^2$ | $Y_1^2 \ldots Y_2^2 \ldots Y_3^2 \ldots$ | $C^2$ |
| . | | |
| . | | |
| $X^{256}$ | $Y_1^{256} \ldots Y_2^{256} \ldots Y_3^{256} \ldots$ | $C^{256}$ |

When the host systems have the summed value for each $X^j$, they know the capacity of the cluster C" needed if the final ρ for share-based VMs is assigned as $X^j$. At step 532, the root host system determines whether the last simulated cluster capacity value, i.e., $X^{256}$ in the set of simulated cluster capacity values is greater than the actual cluster capacity value. If $X^{256}$ is greater than the actual cluster capacity value, then at step 544 the root host system issues a command to all host systems to set entitlement values for their VMs equal to the limits thereof.

Otherwise, at step 534, the root host system determines whether there exists a simulated cluster capacity value in the set of simulated cluster capacity values that is substantially similar to the actual cluster capacity value beyond a particular threshold. If so, then at step 540 this simulated cluster capacity value is averaged together with a subsequent simulated cluster capacity value to produce a final EPSV (ρ). Then, at step 542, the root host system issues a command that causes all host systems included in the cluster to calculate entitlement values for their VMs using the final EPSV(ρ).

Otherwise, at step 536, the root host system chooses $C^k$ and $C^{k+1}$ such that $C^k \leq C \leq C^{k+1}$, where C is the actual cluster capacity. At step 538, $C^k$ is assigned as the new lower bound and $C^{k+1}$ is assigned as the new upper bound, and the method steps 502-532 are repeated. When the condition of step 534 is met, i.e., when there exists $C^k$ and $C^{k+1}$ such that C is close to $C^k$ and $C^{k+1}$ beyond a particular threshold, the EPSV is set as $(X^k + X^{k+1})/2$, as described above in step 540.

Figure 6:
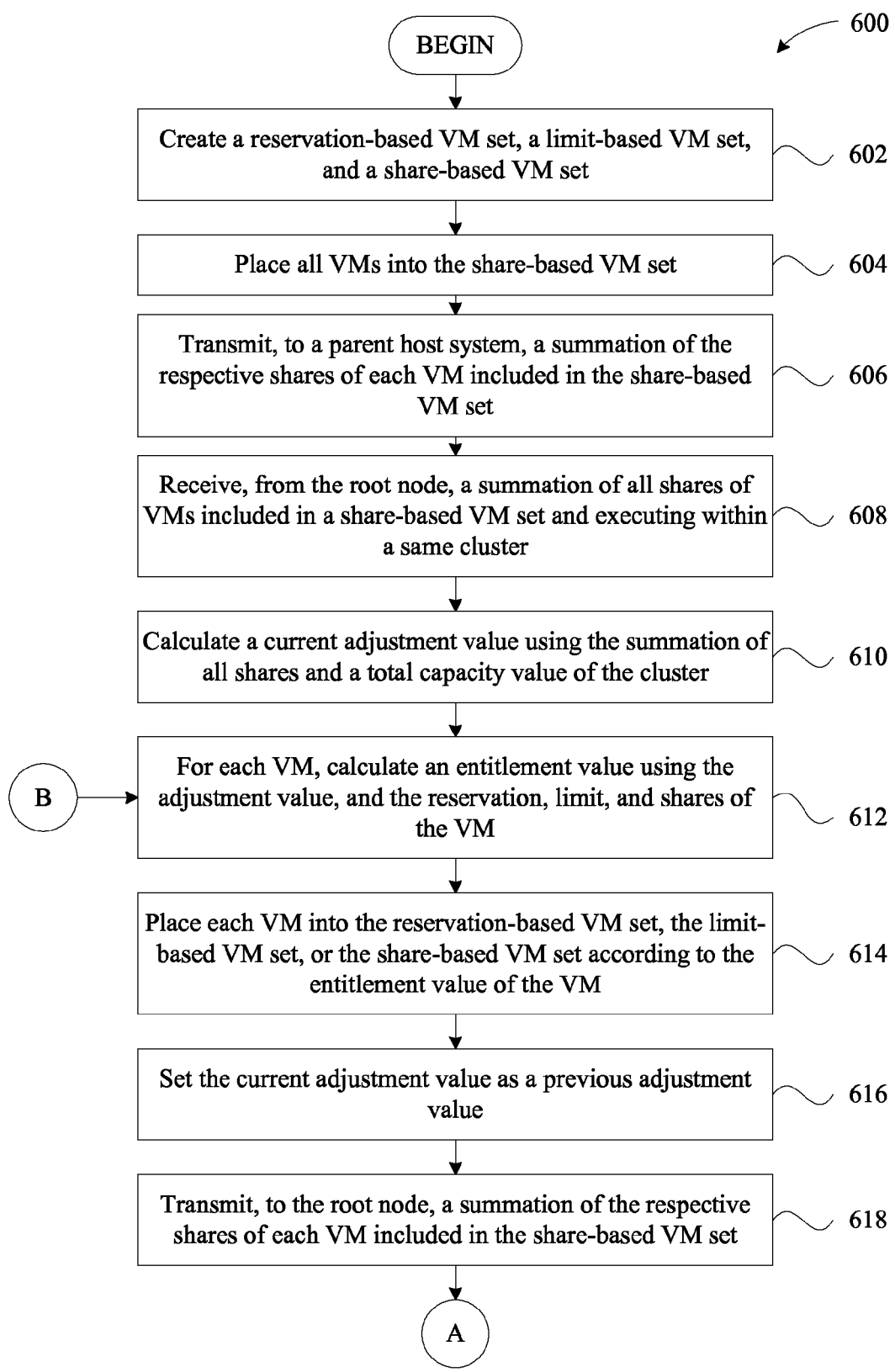
FIG. 6 is a flow diagram of method steps for divvying resources to VMs included in virtual computer system, according to another embodiment.
Figure 6:
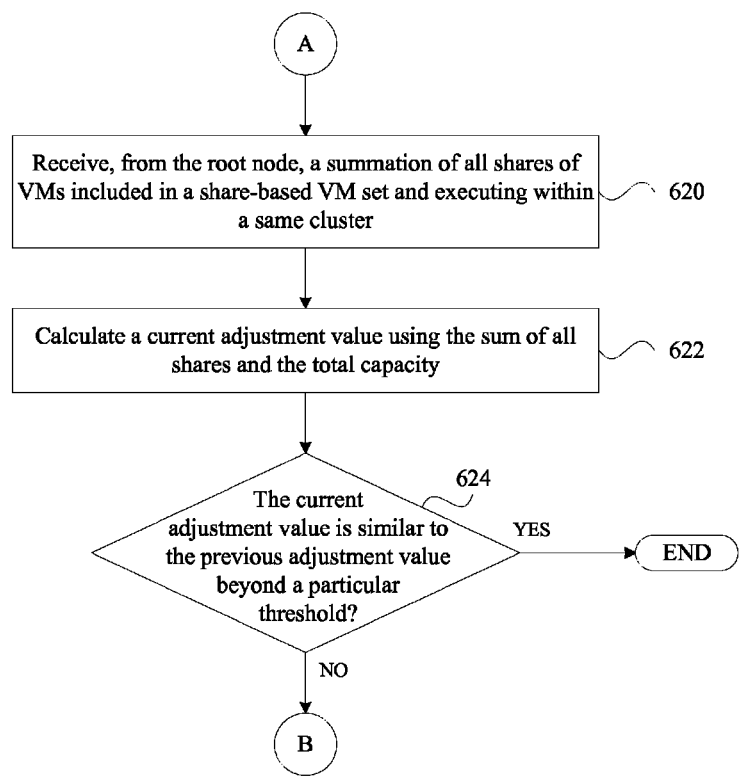

FIG. 6 is a flow diagram of method steps 600 for divvying resources to VMs included in virtual computer system 200, according to another embodiment. As shown, method 600 begins at step 602, where a host system creates a reservation-based VM set, a limit-based VM set, and a share-based VM set. Initially, each set is an empty null set. At step 604, the host system places all VMs executing thereon into the share-based VM set. At step 606, the host system transmits, to a parent host system in a "shares" aggregation tree, a summation of the respective shares of each VM included in the share-based VM set. At step 608, the host system receives, from a root host system in the aggregation tree, a summation of all shares of VMs included in a share-based VM set and executing within the same cluster. At step 610, the host system calculates a current adjustment value, also referred to as an "entitlement factor," using the summation of all shares and a total capacity value of the cluster. In one embodiment, the current adjustment value is defined as the total capacity value of the cluster divided by the summation of all shares in the cluster, and is set as ρ for calculating entitlements according to, e.g., Equation 3. At step 612, the host system calculates for each VM an entitlement value using the adjustment value, and the reservation, limit, and shares of the VM according to Equation 3.

At step 614, the host system places each VM into the reservation-based VM set, the limit-based VM set, or the share-based VM set according to the entitlement value of the VM. At step 616, the host system sets the current adjustment value as a previous adjustment value. At step 618, the host system transmits, to the root node, a summation of the respective shares of each VM included in the share-based VM set. At step 620, the host system receives, from the root node, a summation of all shares of VMs included in a share-based VM set and executing within the cluster. At step 622, the host system calculates a current adjustment value using the sum of all shares and the total capacity. At step 624, the host system determines whether the current adjustment value is similar to the previous adjustment value beyond a particular threshold and, if so, the method 600 terminates. Otherwise, the method returns to step 612 and the steps subsequent thereto are repeated until the current adjustment value is similar to the previous adjustment value beyond the particular threshold.

Figure 7:
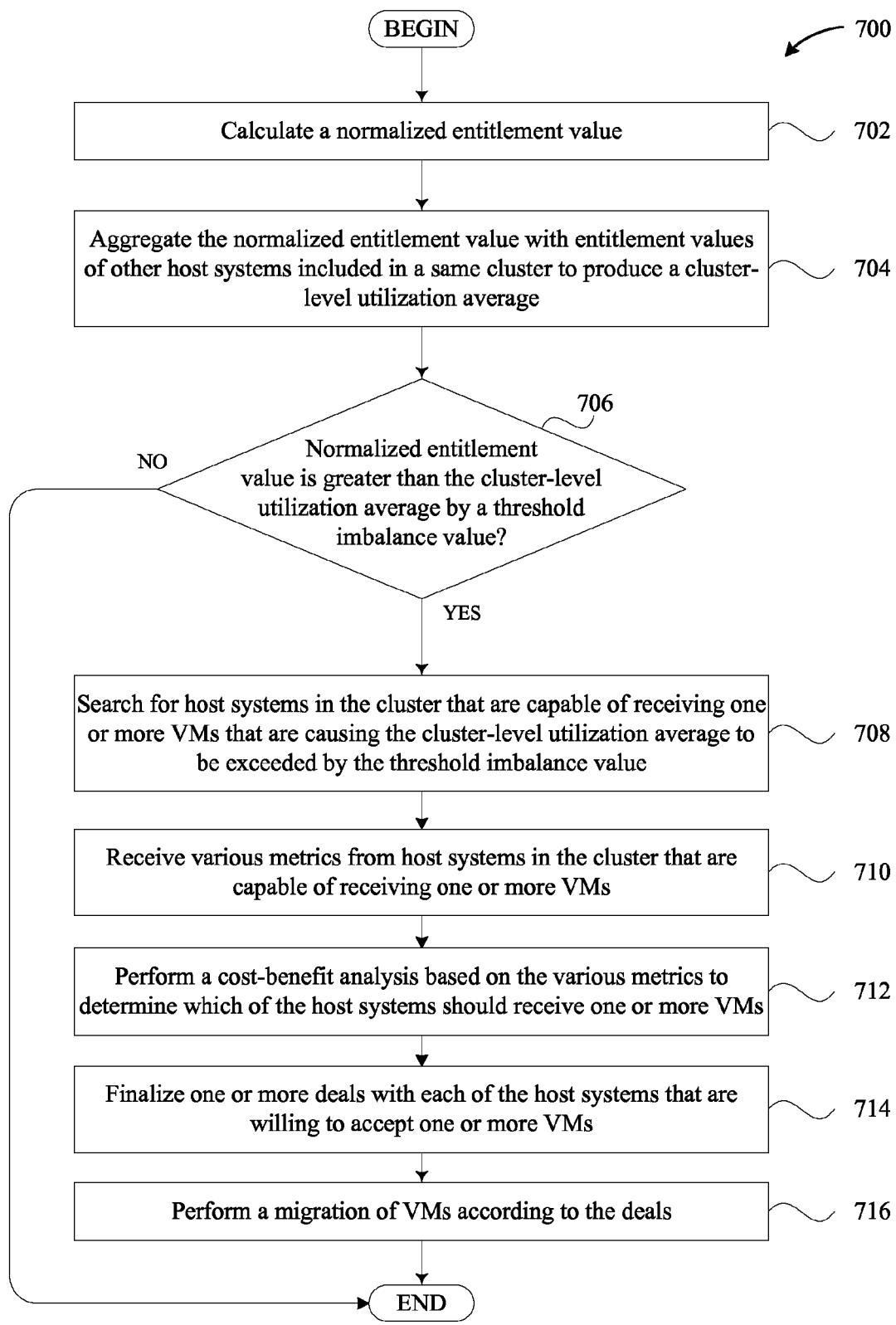
FIG. 7 is a flow diagram that illustrates a method for performing load balancing in a decentralized manner, according to one or more embodiments.

FIG. 7 is a flow diagram that illustrates a method for performing load balancing in a decentralized manner, according to one or more embodiments. As shown, method 700 begins at step 702, where a host system calculates a normalized entitlement value. For a host system h, a normalized entitlement $N_h$ is defined as the sum of the per-VM entitlements $E_i$ for all VMs running on h, divided by the host capacity $C_h$ available to VMs:

$$N_h = \frac{\sum E_i}{C_h}.$$

At step 704, the host system aggregates the normalized entitlement value with entitlement values of other host systems included in a same cluster to produce a cluster-level utilization average. This per-host utilization can be aggregated in a distributed manner to obtain a cluster-level utilization average $N_C$, which is a mean of the $N_h$ of all host systems included in the cluster. Each host system also has knowledge of a cluster wide user-set parameter t, which is a threshold of imbalance that the cluster tolerates.

At step 706, the host system determines whether the normalized entitlement value is greater than the cluster-level utilization average by the threshold imbalance value. Any host system l with $N_l < N_C - t$ self-identifies as a "load receiver," and the method 700 ends. Otherwise, if a host system h has an $N_h$ that is greater than the cluster mean by a margin of t (i.e., $N_h > N_C + t$), then the host system self-identifies as a "load shedder."

At step 708, the host system searches for other host systems in the cluster that are capable of receiving one or more VMs that are causing the cluster-level utilization average to be exceeded by the threshold imbalance value. The host system, which is a load shedder, initiates a network query to find k nearby load receivers. The query from the host system is sent up in an aggregation tree to a parent host system, which may or may not satisfy the query. If the query cannot be satisfied by the parent host system, the parent host system further spreads the query along the tree until k load receivers have responded. The host system can then contact the k load receivers in an attempt to work out a deal.

At step 710, the host system receives various metrics from host systems in the cluster that are capable of receiving one or more VMs. Such information may include host capacity, vector of information about VMs i executing thereon, such as $S_i$, $R_i$, $L_i$, and $E_i$. Then, at step 712, the host system is able to perform a cost-benefit analysis to determine appropriate migrations of VMs that result in improvements to the load situation. At step 714, the host system may then pick host systems from the cost-benefit filtered recommendations that includes one or more receiving host systems, and offer those host systems a deal. At step 716, the host system performs a load balancing operation across the host systems to cause the one or more VMs to be transferred to the host systems. Because more than one load receiver may be involved in a deal, a two-phase commit may be used.

A host system l will not receive a migrated VM if it means that the host system's $$N_l = \frac{\sum E_i}{C_l}$$

will, upon the receipt of one or more VMs, become greater than $N_C + t$. Or, host system l may accept alternative deals that void a current deal. If a deal offer is rejected, the host system looking to migrate VMs may attempt to make a deal with an alternative receiver host system. The host system looking to migrate VMs is also responsible to ensure that its $N_h$ does not fall below $N_C - t$.

The foregoing load balancing techniques are performed by host systems making VM exchanges with each other in order to reduce the variance in N values of different host systems. Such load balancing techniques maintain that all the host system's $N_h$ are within the range $N_C + t$ to $N_C - t$.

Similar techniques to the foregoing load balancing techniques may be used to perform an initial placement of a VM in virtualized computer system 200. In one embodiment, a host system receives a request to power-on a VM and searches for other host systems in the cluster that are capable of receiving the VM, e.g., host systems that are underutilized. The host system receives various metrics from host systems in the cluster that are capable of executing the VM. The host system is then able to perform a cost-benefit analysis to determine which of the responsive host systems is appropriate to receive the VM. Next, the host system selects a recipient host system and offers the recipient host system a deal, which the recipient host system may choose to accept or decline. If the recipient host system accepts the deal, then the VM is powered-on in the recipient host system, and the initial placement of the VM is complete. Otherwise, the host system offers deals to other host systems that are appropriate to receive the VM until the VM is powered-on in a host system.

Power management techniques may be applied to virtualized computer system 200 to provide efficient operation thereof. For example, when hardware resources included in virtualized computer system 200 become undercommitted, it is efficient to transfer the workloads thereof to hardware resources that are capable of handling the workloads, such that the undercommitted hardware resources can be powered-off. Conversely, when host systems included in virtualized computer system 200 become overutilized, additional powered-off hardware resources may be included in virtualized computer system 200 that can be powered-on to receive some of the workload of the overutilized hardware resources.

Figure 8:
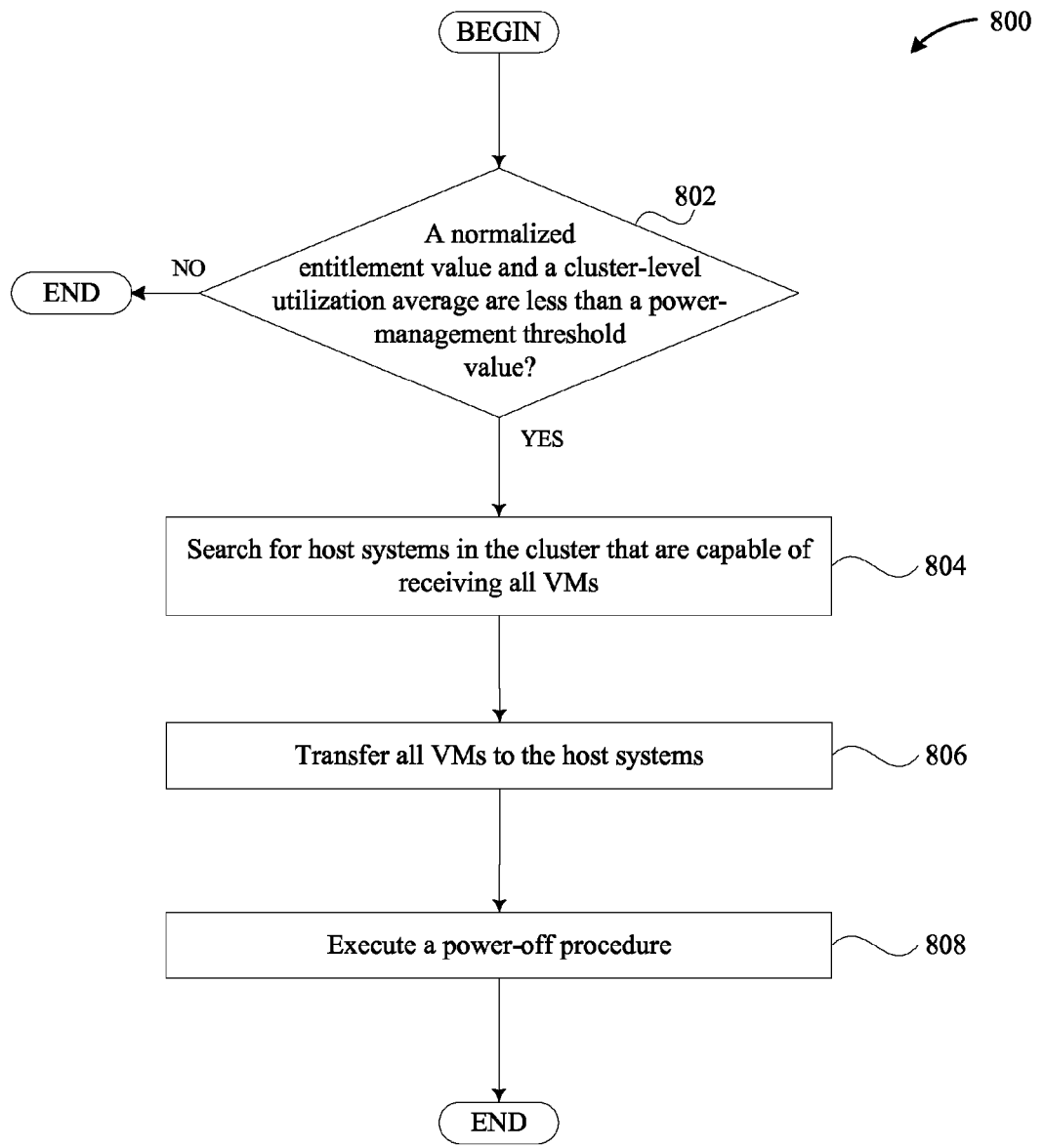
FIG. 8 is a flow diagram that illustrates a method for performing power management operations in a decentralized manner, according to one or more embodiments.

FIG. 8 is a flow diagram that illustrates a method for performing power management operations in a decentralized manner, according to one or more embodiments. As shown, method 800 begins at step 802, where a host system determines whether a normalized entitlement value and a cluster-level utilization average are less than a power-management threshold value. To make this determination, the host system relies on information obtained via the aggregation techniques described herein. Each host system h is associated with a utilization value $N_h$ and a cluster level utilization value $N_C$. In one embodiment, the utilization value $N_h$ is calculated based on at least a utilization level of a CPU included in the host system h and a utilization level of a memory unit (e.g., a random access memory (RAM)) included in the host system h. A host system can decide to power-off if $N_C$ is below a particular threshold and the $N_h$ of host system is sufficiently low, as determined in step 802.

Because the host system will power-off only if the host system can find one or more host systems to receive all its VMs, at step 804, the host system searches for host systems in the cluster that are capable of receiving all VMs being executed on the host system. In one embodiment, the host system sends a query and receives a list of host systems with low $N_h$ values, which indicates that they are capable of receiving VMs from the host system. The host system then initiates a VM migration deal with some of the host systems included in the list.

As part of initiating a deal, the host system may send information about itself such as its capacity, time to boot up, and the like. The recipient of the deal may then use the information to assess various additional offers. For example, if a host system receives a request to shed load from two other hosts systems for power management purposes, the host system may choose to accept the load from the smaller host system and reject the load from the larger host system. The recipient also simulates a new cluster average $N'_C$ as if the host system were removed from the cluster, and will agree to receive the load only if its $N_h$ will not, as a result, exceed $N'_C+t$.

Once the host system has brokered a deal with a recipient that has agreed to receive a one or more VMs, the deal is valid for a specified time, after which the deal expires. If the host system is able to work out deals with other host systems for each of its VMs without violating any of the cluster constraints, the host system will consider its request to power-off successful, and at step 806, the host system will enter evacuate mode immediately and shed all of its VMs to the other host systems, and then power-off.

In situations where hardware resources in virtualized computer system 200 become overcommitted, embodiments provide a technique whereby powered-off hardware resources may be powered-on to provide relief to the overcommitted hardware resources. In one embodiment, information associated with powered-off host systems is stored in powered-on host systems included in, e.g., a same network overlay. The closest host system in the network overlay acts as a primary replica of the powered-off host system and advertises the presence of the powered-off host system in an aggregation tree that maintains information about available host systems for power-on operations. When a load on a host system increases and the host system cannot find other host systems to take on its load, the host system issues a query to locate a powered-off host system so that the host system can be powered-on to receive at least part of its load. Accordingly, when the powered-off host system is powered-on, the host system performs the load balancing techniques describe above in conjunction with FIG. 7.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for dividing computing resources of a plurality of host computers among a plurality of virtual machines (VMs), the method comprising:

calculating a plurality of candidate values for entitlement-per-share based on entitlement data received from the plurality of host computers, wherein the entitlement data comprises reservation values, shares values, and limit values associated with the plurality of VMs executing on the plurality of host computers, and wherein the plurality of candidate values for entitlement-per-share comprises a range of values bounded by a floor value calculated based on a total capacity value of computing resources of the plurality of host computers, a sum of said reservation values, a sum of said shares values, and a minimum value of ratios, each of which is a ratio of a reservation value to a shares value for one of the plurality of VMs, and a ceiling value calculated based on a maximum value of ratios, each of which is a ratio of a limit value to a shares value for one of the plurality of VMs;

determining an entitlement-per-share factor that causes a sum of simulated VM entitlement values to be associated with the total capacity value of computing resources of the plurality of host computers; and causing each host computer in the plurality of host computers to calculate a VM entitlement value for each VM executing on the host computer based on the entitlement-per-share factor, wherein the entitlement-per-share factor specifies an amount of the computing resources each VM executing on the host computer receives based on a shares value associated with each VM.

2. The method of claim 1, wherein the plurality of candidate values for entitlement-per-share are equidistant values divided from the range of values bounded by said floor value and said ceiling value.

3. The method of claim 2, wherein determining the entitlement-per-share factor includes narrowing the range between the floor value and the ceiling value and recalculating the plurality of candidate values for entitlement-per-share.

4. The method of claim 1, wherein the entitlement data received from the plurality of host computers is received from child nodes of a multicast tree that includes each host computer in the plurality of host computers.

5. The method of claim 1, wherein the step of causing each host computer in the plurality of host computers to calculate a VM entitlement value for each VM executing on the host computer based on the entitlement-per-share factor occurs when the entitlement-per-share factor converges beyond a particular threshold.

6. The method of claim 1, wherein determining the entitlement-per-share factor further comprises:

calculating, by operation of each host computer, a simulated VM entitlement value for each VM executing on the host computer using a first value of the plurality of candidate values for entitlement-per-share;

calculating, by operation of each host computer, a cumulative entitlement value for the VMs executing on the host computer based on the simulated VM entitlement values associated with the first value of the plurality of candidate values;

calculating, across the plurality of host computers, the sum of the simulated VM entitlement values for the plurality of VMs executing on the plurality of host computers based on the cumulative entitlement values associated with the first value of the plurality of candidate values for entitlement-per-share.

7. The method of claim 6, further comprising:

receiving, at one of the plurality of host computers, the plurality of candidate values for entitlement-per-share from a root host computer of the plurality of host computers;

reporting, to the root host computer, the cumulative entitlement value for the VMs executing on the one of the plurality of the host computers.

8. The method of claim 1, wherein determining the entitlement-per-share factor further comprises:

performing a binary search for the entitlement-per-share factor using the plurality of candidate values for entitlement-per-share and based on the total capacity value of computing resources of the plurality of host computers.

9. The method of claim 1, wherein causing each host computer in the plurality of host computers to calculate the VM entitlement value for each VM executing on the host computer based on the entitlement-per-share factor further comprises:

determining, by operation of each host computer, a share-based allocation for a first VM based on a shares value associated with the first VM and on the entitlement-per-share factor;

determining the VM entitlement value for the first VM to be at least one of: the share-based allocation, a reservation value associated with the first VM responsive to determining the share-based allocation for the first VM is less than the reservation value, and a limit value associated with the first VM responsive to determining the share-based allocation for the first VM is greater than the limit value.

10. A non-transitory computer readable storage medium storing instructions that, when executed by a processor, cause the processor to load balance virtual machines (VMs) across a plurality of host computers, by performing the steps of:
dividing computing resources of a plurality of host computers among a plurality of virtual machines (VMs), the method comprising:
calculating a plurality of candidate values for entitlement-per-share based on entitlement data received from the plurality of host computers, wherein the entitlement data comprises reservation values, shares values, and limit values associated with the plurality of VMs executing on the plurality of host computers, and wherein the plurality of candidate values for entitlement-per-share comprises a range of values bounded by a floor value calculated based on a total capacity value of computing resources of the plurality of host computers, a sum of said reservation values, a sum of said shares values, and a minimum value of ratios, each of which is a ratio of a reservation value to a shares value for one of the plurality of VMs, and a ceiling value calculated based on a maximum value of ratios, each of which is a ratio of a limit value to a shares value for one of the plurality of VMs;
determining an entitlement-per-share factor that causes a sum of simulated VM entitlement values to be associated with the total capacity value of computing resources of the plurality of host computers; and
causing each host computer in the plurality of host computers to calculate a VM entitlement value for each VM executing on the host computer based on the entitlement-per-share factor, wherein the entitlement-per-share factor specifies an amount of the computing resources each VM executing on the host computer receives based on a shares value associated with each VM.

11. The non-transitory computer readable storage medium of claim 10, wherein the plurality of candidate values for entitlement-per-share are equidistant values divided from the range of values bounded by said floor value and said ceiling value.

12. The non-transitory computer readable storage medium of claim 11, wherein determining the per-share factor includes narrowing the range between the floor value and the ceiling value and recalculating the plurality of candidate values for entitlement-per-share.

13. The non-transitory computer readable storage medium of claim 10, wherein the entitlement data received from the plurality of host computers is received from child nodes of a multicast tree that includes each host computer in the plurality of host computers.

14. The non-transitory computer readable storage medium of claim 10, wherein the step of causing each host computer in the plurality of host computers to calculate a VM entitlement value for each VM executing on the host computer based on the entitlement-per-share factor occurs when the entitlement-per-share factor converges beyond a particular threshold.

15. The non-transitory computer readable storage medium of claim 10, wherein determining the entitlement-per-share factor further comprises:
calculating, by operation of each host computer, a simulated VM entitlement value for each VM executing on the host computer using a first value of the plurality of candidate values for entitlement-per-share;
calculating, by operation of each host computer, a cumulative entitlement value for the VMs executing on the host computer based on the simulated VM entitlement values associated with the first value of the plurality of candidate values; and
calculating, across the plurality of host computers, the sum of the simulated VM entitlement values for the plurality of VMs executing on the plurality of host computers based on the cumulative entitlement values associated with the first value of the plurality of candidate values for entitlement-per-share.

16. The non-transitory computer readable storage medium of claim 15, further comprising:
receiving, at one of the plurality of host computers, the plurality of candidate values for entitlement-per-share from a root host computer of the plurality of host computers;
reporting, to the root host computer, the cumulative entitlement value for the VMs executing on the one of the plurality of the host computers.

17. The non-transitory computer readable storage medium of claim 10, wherein determining the entitlement-per-share factor further comprises:
performing a binary search for the entitlement-per-share factor using the plurality of candidate values for entitlement-per-share and based on the total capacity value of computing resources of the plurality of host computers.

18. The non-transitory computer readable storage medium of claim 10, wherein causing each host computer in the plurality of host computers to calculate the VM entitlement value for each VM executing on the host computer based on the entitlement-per-share factor further comprises:
determining, by operation of each host computer, a share-based allocation for a first VM based on a shares value associated with the first VM and on the entitlement-per-share factor;
determining the VM entitlement value for the first VM to be at least one of: the share-based allocation, a reservation value associated with the first VM responsive to determining the share-based allocation for the first VM is less than the reservation value, and a limit value associated with the first VM responsive to determining the share-based allocation for the first VM is greater than the limit value.

* * * * *